US006229704B1

(12) United States Patent
Hoss et al.

(10) Patent No.: US 6,229,704 B1
(45) Date of Patent: *May 8, 2001

(54) THERMAL CONNECTION SYSTEM FOR MODULAR COMPUTER SYSTEM COMPONENTS

(75) Inventors: Shawn P. Hoss, Round Rock; David L. Moss, Austin, both of TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,867

(22) Filed: Oct. 19, 1999

(51) Int. Cl.[7] ............................................ H05K 7/20
(52) U.S. Cl. ..................... 361/704; 361/688; 361/689; 361/699; 361/700; 361/702; 361/715; 361/716; 174/15.1; 174/15.2; 165/80.4; 165/185
(58) Field of Search ............................. 361/687–690, 361/698, 700, 704, 707, 711, 717–720; 257/714, 715; 174/15.1, 15.2; 165/80.4, 104.33, 185

(56) References Cited

U.S. PATENT DOCUMENTS

| 3,035,419 | * | 5/1962 | Wigert | 62/259.2 |
| 3,620,298 | | 11/1971 | Somerville et al. | 165/105 |
| 4,120,019 | * | 10/1978 | Arii et al. | 361/699 |
| 4,627,487 | | 12/1986 | Basiulis | 165/104.26 |
| 5,343,358 | * | 8/1994 | Hilbrink | 361/700 |
| 5,398,748 | | 3/1995 | Yamaji et al. | 165/104.21 |
| 5,557,501 | | 9/1996 | DiStefano et al. | 361/704 |
| 5,568,360 | | 10/1996 | Penniman et al. | 361/687 |
| 5,597,035 | | 1/1997 | Smith et al. | 165/80.3 |
| 5,718,282 | * | 2/1998 | Bhatia et al. | 361/700 |
| 5,781,409 | * | 7/1998 | Mecredy, III | 361/687 |
| 5,796,581 | * | 8/1998 | Mok | 361/687 |
| 5,822,187 | * | 10/1998 | Garner et al. | 361/687 |
| 5,826,645 | * | 10/1998 | Meyer, IV et al. | 165/104.33 |
| 5,828,549 | | 10/1998 | Gandre et al. | 361/695 |
| 5,829,515 | | 11/1998 | Jeffries et al. | 165/80.3 |
| 5,832,987 | * | 11/1998 | Lowry et al. | 165/86 |
| 5,898,569 | * | 4/1999 | Bhatia | 361/600 |
| 5,936,836 | | 8/1999 | Scholder | 361/695 |
| 5,946,191 | * | 8/1999 | Oyamada | 361/700 |
| 5,959,836 | * | 9/1999 | Bhatia | 361/687 |
| 6,052,285 | * | 4/2000 | Hileman | 361/699 |
| 6,125,035 | | 9/2000 | Hood, III et al. | 361/687 |

* cited by examiner

Primary Examiner—Leo P. Picard
Assistant Examiner—Boris L. Chervinsky
(74) Attorney, Agent, or Firm—Baker Botts L.L.P.

(57) ABSTRACT

A method and system of thermally connecting internal components of a computer system to a heat sink. The components are arranged as modular units, each having at least one component heat conductor extending from it. For each component heat conductor, an arterial heat conductor extends from the heat sink. Each module heat conductor is attached orthogonally to its associated arterial heat conductor, using a special thermal connector.

14 Claims, 4 Drawing Sheets

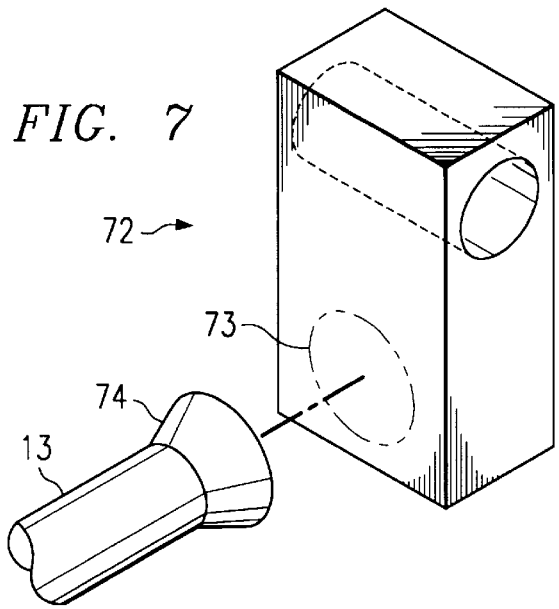
FIG. 7
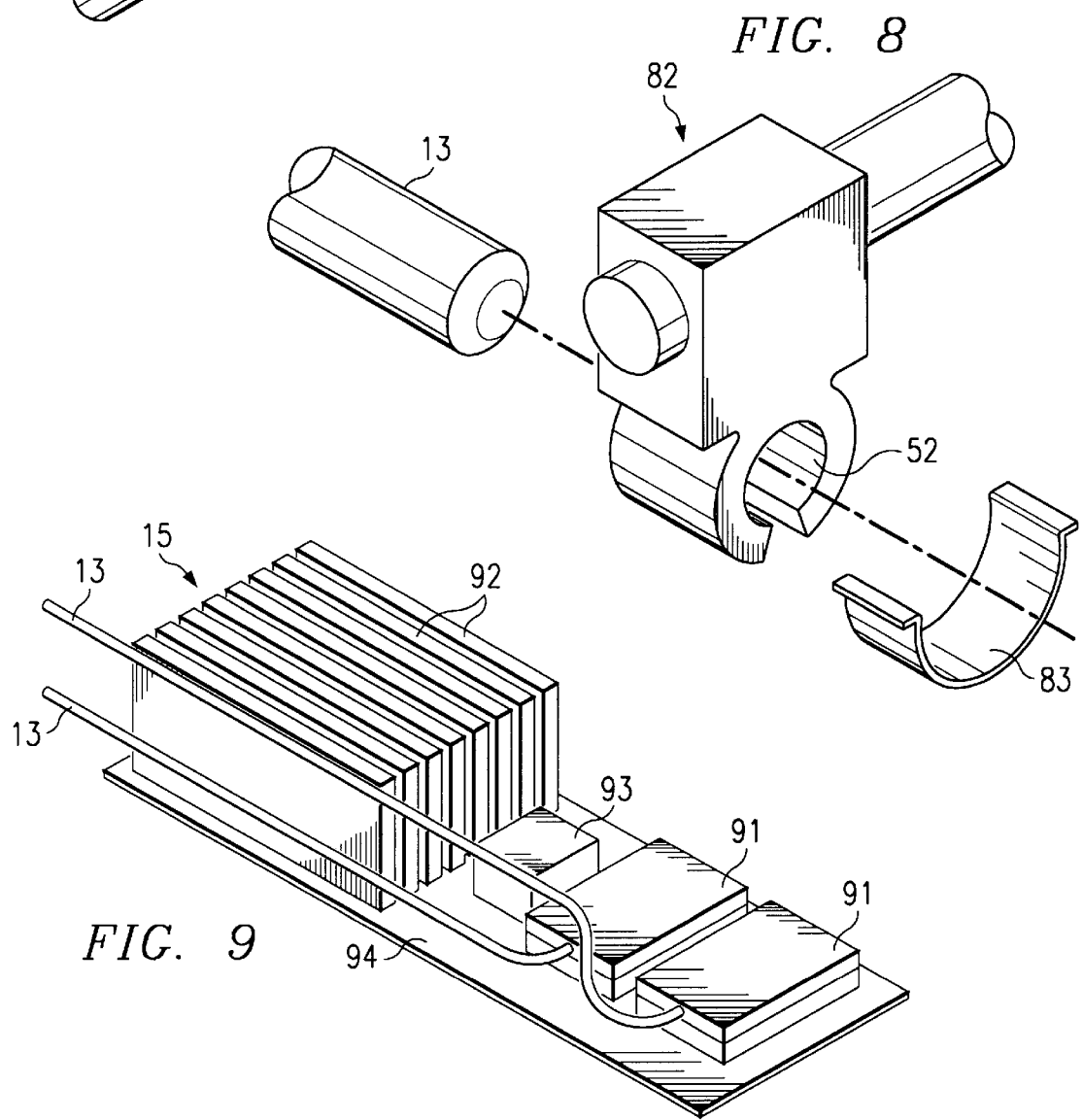
FIG. 8
FIG. 9

THERMAL CONNECTION SYSTEM FOR MODULAR COMPUTER SYSTEM COMPONENTS

TECHNICAL FIELD

This invention relates to computer systems, and more particularly to devices for transferring heat away from internal computer system components.

BACKGROUND

Heat dissipation is a major issue in the design and operation of semiconductor devices ("chips"). Too much heat can destroy the structure of a chip and affect its operation. The tight packing of chips in today's computer systems makes them even more vulnerable to damage from heat.

One approach to avoiding overheating is with the use of an active cooling device, such as a fan. Conventionally, a fan is a component of the computer system, contained in the computer chassis.

Another approach to avoiding overheating is the use of a passive cooling device, such as a heatsink. A heatsink provides a surface area from which heat can radiate. Many heatsinks have fins or some other geometry that increases their surface area. They are made from a material having good thermal conduction, such as aluminum. Some computers are designed so that the computer chassis provides a heatsink. An advantage of passive cooling devices is that no power-consuming mechanism is required; the heatsink operates by natural convection whereby warm air rises away from the heatsink and cool air flows toward the heatsink to replace the warm air.

Both fans and heat sinks present design challenges because they must be placed where they will be effective, yet not add bulk to the computer system. Also, electrical design considerations result in competition between electrical components and thermal components for the same "real estate".

Heat pipes have been used to alleviate design problems to some extent. Heat pipes are used in conjunction with heatsinks, and conduct heat away from a heat-generating component to the heat sink. A popular design of today's computers is the use of the computer chassis as a heatsink with heat pipes conducting heat from the internal components to the chassis. However, the addition of heat pipes has often resulted in increased manufacturing complexity and reduced serviceability after manufacture, because of the connections required for the heat pipes.

SUMMARY

One aspect of the invention is a thermal connection system for cooling integrated circuit components. The thermal connection system has a number of component heat conductors. One end of the component heat conductor is connectable to an integrated circuit component, such that the heat conductor extends from the integrated circuit component generally parallel to other component heat conductors. Each component heat conductor has an associated arterial heat conductor, which is connectable to a heat sink at one end such that it extends from the heat sink. A thermal connector orthogonally connects the free end of each component heat conductor to the free end of each arterial heat conductor. The thermal connector is removably attached to the component heat conductor, and it may also be removably attached to the arterial heat conductor. In this manner, each thermal connector provides a complete heat transfer path from a heat-generating component to the heat sink.

As a result of the above-described thermal connection system, components are thermally connected to one or more arterial heat conductors, rather than directly to the heat sink. The thermal connectors permit components to be easily added and removed. The connector provides a self-aligned connection, which reduces manufacturing effort.

The design provides for a central cooling location for all components, and relaxes constraints related to the need for cooling devices immediately proximate to the components to be cooled. This permits even the most critical components, such as processor and memory units, to be reduced in size, more tightly packed, and more easily serviced.

The above-described thermal connection system is consistent with a removable modular design for processing and memory components of a computer system. Each module contains one or more integrated circuit components. The thermal connectors permit the modules to have "plug in" thermal connections.

BRIEF DESCRIPTION OF THE DRAWINGS

FIGS. 6–8 illustrate alternative embodiments of the connector of FIGS. 4 and 5.

FIG. 9 illustrates an example of components of a module and its component heat conductors.

DETAILED DESCRIPTION

Figure 1:
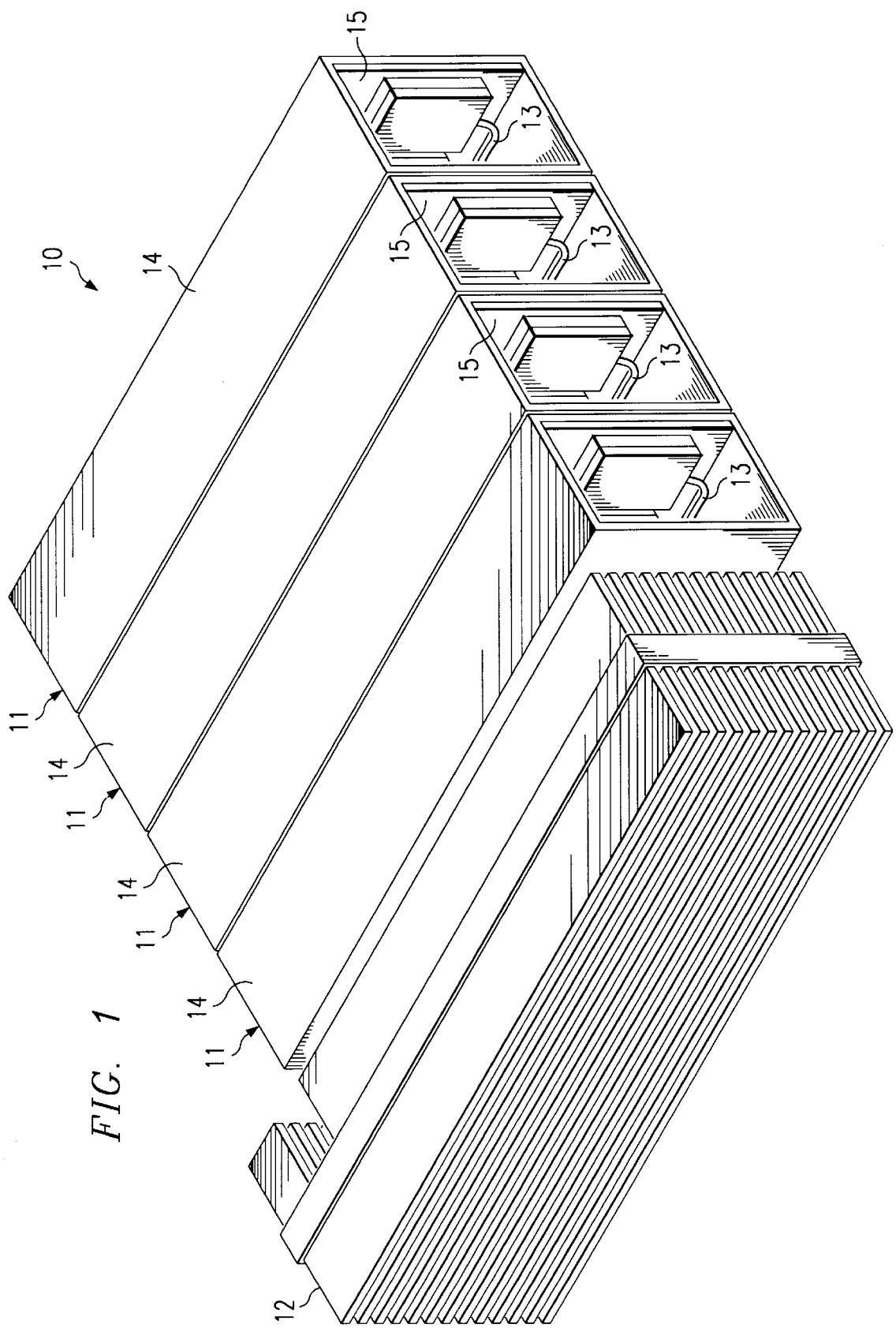
FIG. 1 is a front perspective view of a digital processing unit having a thermal connection system in accordance with the invention.
Figure 2:
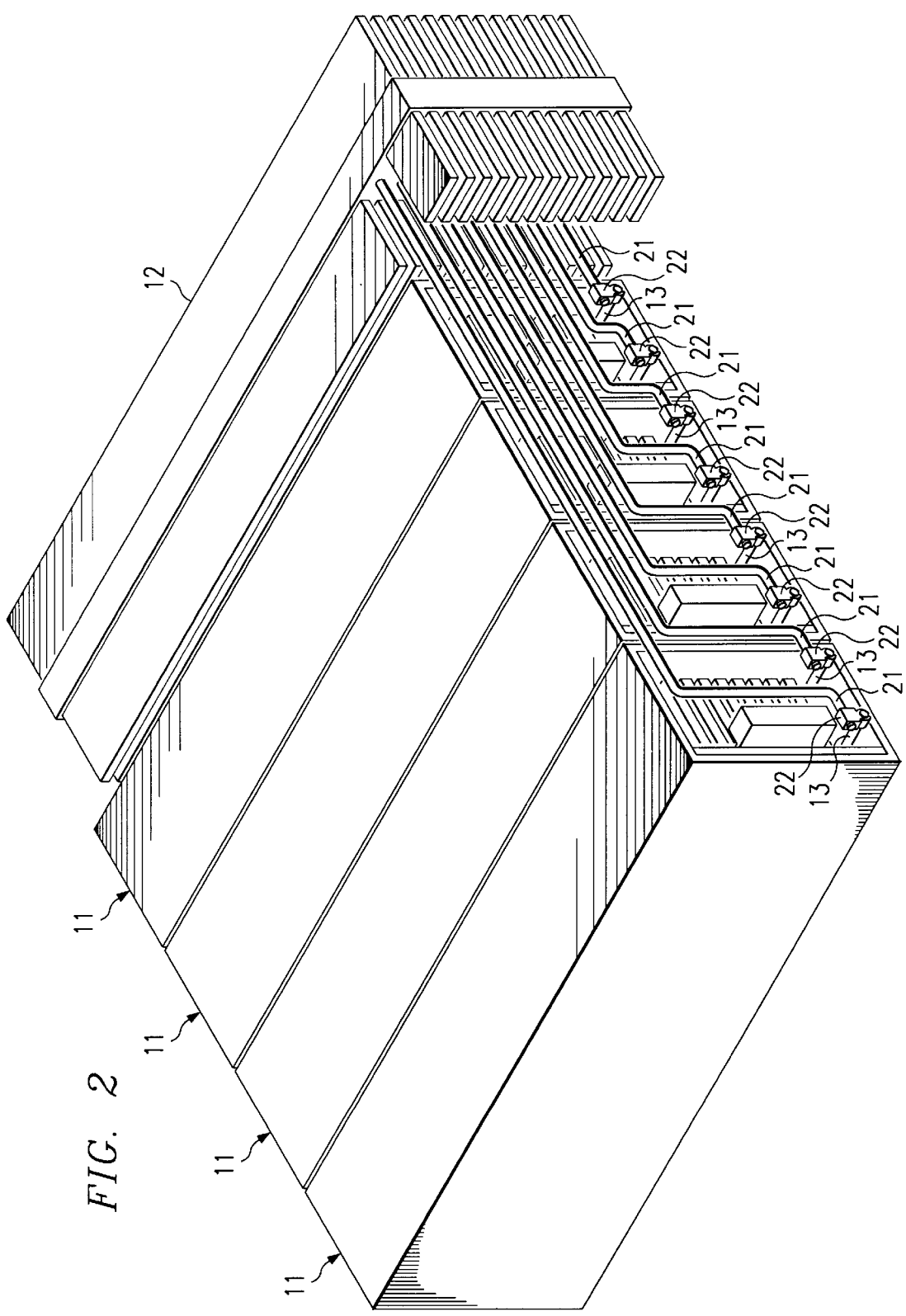
FIG. 2 is a rear perspective view of the digital processing unit of FIG. 1.

FIGS. 1 and 2 are front and rear perspective views, respectively, of a digital processing unit 10, comprised of a number of modules 11 and a heat sink 12. In the example of this description, processing assembly 10 has four modules, but the number of modules is not significant to the invention.

Modules 11 are designed for use in a computer system, and may contain any type of integrated circuitry associated with digital processing, controlling, or micro-electromechanics. For example, processing unit 10 may function as the system unit of a computer, akin to a "system board" or an "expansion board". The term "digital processing" is used herein in a broad sense to include any function associated with a computing system—processing unit 10 need not necessarily contain any module 11 having a processor. Although not illustrated, each module 11 typically has appropriate electrical connections to a bus or other data communications link.

Each module 11 has at least one heat conductor 13 that extends to the rear of the module 11 and connects to heat sink 12, via a special thermal connection system. In the example of this description, each module 11 has two heat conductors 13, the second being hidden from view in FIG. 1 but shown extending from the rear of each module 11 in FIG. 2. Component heat conductors 13 are substantially parallel to each other.

Each module 11 is comprised of a housing 14, which contains an integrated circuit card 15. One or more integrated circuit devices (ICs) are mounted on card 15. An example of a card 15 and its ICs is described below in connection with FIG. 6. In the example of this description, each module 11 appears the same. However, modules 11 may differ with respect to their internal circuitry or even their shape and size. In a broad sense, a module 11 may simply comprise a single IC.

Heat sink 12 may be any type of heat sink, such as those used in computing equipment. Examples of suitable heat sinks may be found in today's desktop and portable computer systems. In the example of this description, heat sink 12 has fins for enhancing its ability to dissipate heat. Heat sink 12 could alternatively be in the form of metal plates attached to a computer chassis, or could have any one of a number of other configurations. A fan (not shown) may be used in conjunction with heatsink 12 to increase convection.

Referring especially to FIG. 2, an array of arterial heat conductors 21 lies along the back of unit 10. Each arterial heat conductor 21 is connected to a module heat conductor 13 at a heat input end, and to the heat sink 12 at a heat output end. In the example of FIG. 2, the arterial heat conductors 21 are substantially parallel to each other, so as to be in a common plane along the backplane of modules 11. However, other configurations are possible.

Heat conductors 13 and heat conductors 21 may be conventional heat pipes or any other type of heat conductor. They are characterized by being constructed of one or more materials that provides them with efficient heat conductivity. An example of a suitable heat conductor is a heat pipe having a porous wick or inner core to carry heated liquid or vapor inside the heat conductor. However, heat conductors 13 and 21 could be solid or could have some other structure.

In the example of this description, component heat conductors 13 and arterial heat conductors 21 are both round and have substantially the same diameter. However, differently shaped heat conductors may be used, and heat conductors 21 need not have the same shape or diameter as heat conductors 13. However, typically, component heat conductors 13 will have the same size and shape at their heat output ends, so as to facilitate the connection scheme described herein.

A special thermal connector 22 joins each component heat conductor 13 to each arterial heat conductor 21. The connection is orthogonal, that is, it provides a right angle turn for the heat path from a module 11 to the heat sink 12.

Each thermal connector 22 is made from a material that conducts heat, so that heat from a component heat conductor 13 may be transferred to an arterial heat conductor 21 via the connector 22. Examples of suitable materials are copper and aluminum or their alloys. Connector 22 could be a conductive plastic, which as explained below, would give it elastic properties. A special design for a "die cast" connector 22 is described below in connection with FIG. 5. Regardless of the particular design of connector 22, it provides a thermal connection so that a path of heat conduction from the module 11 to the heat sink 12 is complete.

Although each module 11 may have different circuitry and may have differently shaped housings 14, modules are configured so that they may be connected in the same manner to arterial heat conductors 21, using connectors 22. Thus, each module has at least one component heat conductor 13 extending from its housing 14 in a manner that permits the module 11 to join to an arterial heat conductor 21.

Figure 3:
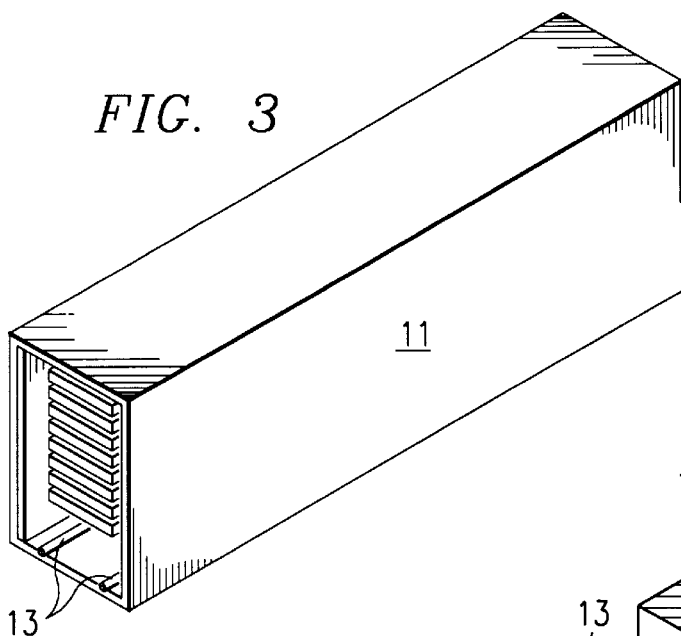
FIG. 3 is a rear perspective view of a single module unattached to the thermal connector.

FIG. 3 is a rear perspective view of a single module 11, unattached to an arterial heat conductor 21. In the example of FIG. 3, as in FIGS. 1 and 2, module 11 has two component heat conductors 13 connected to its ICs or directly to its board. The use of two component heat conductors 13 from each module is for purposes of example; a single heat conductor or three or more heat conductors could be used. As explained below, the number of heat conductors per module 11 may be related to the number of ICs from which heat is to be transported.

Figure 4:
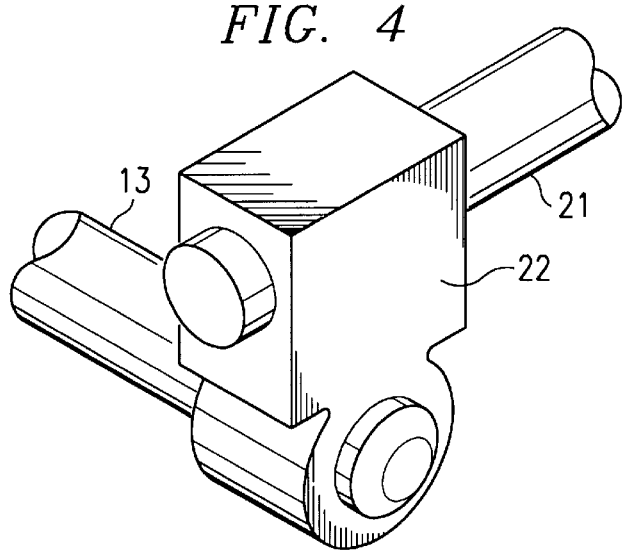
FIG. 4 is a detailed perspective view of one of the connectors of FIG. 2.
Figure 5:
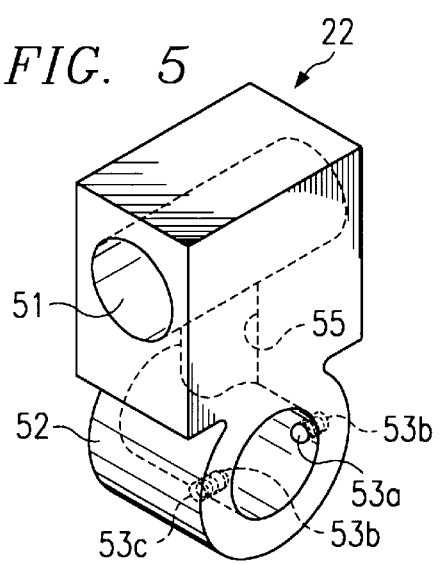
FIG. 5 illustrates the internal structure of the connector of FIG. 4.

FIGS. 4 and 5 illustrate one embodiment of a connector 22. FIG. 4 is a perspective view, and FIG. 6 illustrates the internal structure.

Each connector 22 is generally solid piece of material having orthogonal internal channels for insertion of a heat conductor 13 and heat conductor 21. In the example of FIG. 4, the top portion of connector 22 receives an arterial heat conductor 21; the bottom portion receives a module heat conductor 13. Thus, connector 22 has a height slightly greater than the sum of the diameter of a component heat conductor 13 and the diameter of an arterial heat conductor 22. Its width is sufficient to accommodate the diameter of a heat conductor 13 and a heat conductor 21.

Figure 6:
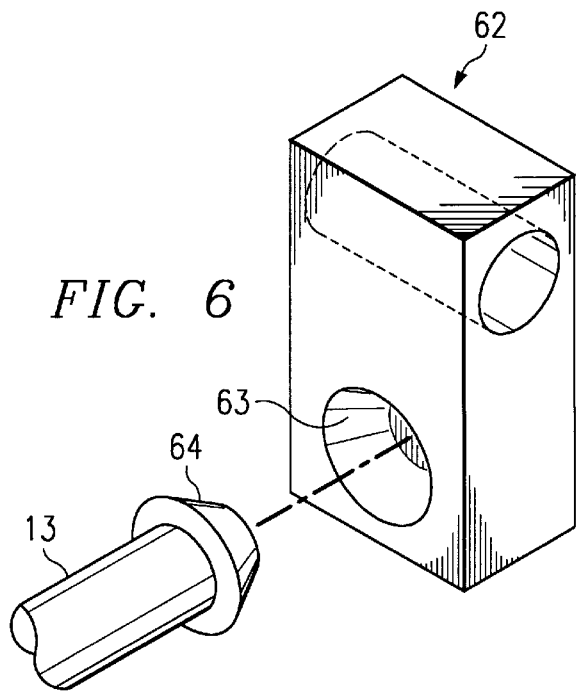

The embodiment of FIGS. 5 and 6 is especially suitable when connectors 22 are to be translatable along, and rotatable around, component heat conductor 13 and arterial heat conductor 21. A first channel 51 receives a heat conductor 21; a second channel 52 receives a heat conductor 13. The heat conductors may be inserted from either direction. The two channels 51 and 52 are orthogonal to each other for an orthogonal connection of the respective heat conductors. The ends of the conductors may be chamfered to facilitate insertion, as is the end of conductor 13 in FIG. 5.

The external profile of connector 22 can be squared, as is the top portion of connector 22, or rounded, as is the bottom portion of connector 22. The external shape of connector 22 is not particularly important. Connector 22 could be entirely rectangular, as is the top portion. Or, connector 22 could be rounded around the respective channels, as is the bottom portion. Furthermore, although the component heat pipe 13 is illustrated as being used with the rounded (bottom) portion, and the arterial heat pipe 21 is illustrated as being used with a rectangular (top) portion, this arrangement could easily be reversed.

To better secure heat conductor 13 within connector 22, at least one seating tab 53a is attached to the inner surface of channel 52. In the example of this description, seating tab 53a is spring loaded, such that a spring 53b in channel 53c, applies a constant force that pushes tab 53a against heat conductor 13 after heat conductor 13 is inserted into channel 52. Multiple tabs 53a may be used, or tab 53a could be in the shape of a collar that partially or completely encircles heat conductor 13. In other embodiments, other means for removably securing heat conductors 13 within connectors 22 could be used. For example, the force applied to each heat conductor 13 could simply be the result of a tight fit and friction. A thermal grease may be used to coat the mating surfaces.

An optional feature of connector 22 is an inner core 55 especially designed for heat transport. Core 55 could be hollow or could contain a porous material similar to that used for heat conductors 13 and 21. A die cast manufacturing process could be used to manufacture a connector 22 having a core 55.

The attachment of each connector 22 to a module heat conductor 13 is designed to be removable. As illustrated, the ends of heat conductors 13 are chamfered to facilitate insertion into connector 22. An advantage of the channel type attachment of FIGS. 4 and 5 is that the heat conductor 13 may be inserted from either side of connector 22, may be translated within the channel. The channel type attachment further permits connector 22 to rotate around arterial heat conductor 21 and would even permit a "Christmas tree" type arrangement of modules 11.

An advantage of a translatable and/or rotatable connection is that some play is provide to accommodate modules 11 of different sizes and shapes. However, where modules 11 are all the same size, the spacing of connectors 22 on arterial heat conductors 21 may be predetermined, and each connector 22 may have a fixed attachment to arterial heat conductor 21.

The removable attachment of connectors 22 to heat conductors 13 is especially useful during assembly of processing unit 10. Each module's heat conductor(s) 13 may be simply inserted into a connector 22. At this point, connectors 22 and arterial heat conductor 21 may be already assembled as a unit, or the insertion of arterial heat conductor 21 into connectors 22 may occur later.

Connectors 22 permit each heat conductor 13 to have a removable connection to arterial heat conductor 21. However, once a heat conductor 13 is inserted into connector 22, it is sufficiently secure to as to remain inserted until force is applied to remove it. Similar means could be used to attach connectors 22 to arterial heat conductors 21, when connectors 22 are to be removable, translatable, and/or rotatable.

The attachment of connectors 22 to heat conductors 21 may be removable or may be fixed. An advantage of a removable attachment, or at least one that is translatable along arterial heat conductor 21, is that modules 11 of varying shapes and sizes may be connected.

FIGS. 6–8 illustrate alternative embodiments of connector 22, having various means for attachment of the heat conductors. Like connector 22, each embodiment is designed so that a component heat conductor 13 and an arterial heat conductor 21 may be easily attached. The attachments may optionally be removable, translatable along one or both conductors, or rotatable around one or both heat conductors, or any combination of these alternatives.

In FIGS. 6–8, various means for attachment of component heat conductor 13 are illustrated as alternatives to the channels of FIGS. 4 and 5. The means for attachment for arterial heat conductor 21 is a channel. However, the illustrated attachment mechanism could be also, or alternatively, used for the component heat conductor 21.

Regardless of the specific attachment means implemented for connector 22, a common characteristic of all embodiments of connector 22 is that the attachment means provides a self aligning connection between a heat connector 13 and a heat connector 21. In other words, the mechanical structure guides the connection, and reduces the effort required during manufacture.

FIG. 6 is a perspective view of a connector 62 having an indentation 63 for receiving a component heat conductor 13. As illustrated, the leading tip 64 of the component heat conductor 13 is chamfered to provide a mating connection within the indentation. To increase the contacting surface area, the tip 64 may be enlarged relative to the diameter of the component heat conductor 13. This increased surface area provides enhanced heat conduction. Spring loaded tabs, similar to those of FIG. 5, may be used to secure the connection.

FIG. 7 is a perspective view of a connector 72 having a mating surface 73 for receiving a component heat conductor 13. The leading tip 74 of the component heat conductor 13 is fluted, so as to increase the contacting surface area. The connection may be soldered, bonded, or otherwise attached.

FIG. 8 is perspective view of a connector 82 that is a modification of connector 22. Connector 82 only partially surrounds component heat conductor 13, such that channel 52 is partially open to form a collar. A clip 83 is used to encircle the open portion of the channel 52. This embodiment is most suitable when connector 82 is made from a deformable material, such as a plastic. The fit of connector 82 around heat conductor 13 may be initially loose, with clip 83 used to tighten the attachment. The loose fit facilitates manufacture, with the clip 83 ensuring that a good thermal connection is accomplished. Clip 83 may also be of an elastic material, to provide a self clamping effect, or may include some sort of mechanical clamp (not shown) may be used.

FIG. 9 illustrates an example of a card 15 within module 11, and shows various ICs mounted on the card. The card 15 of this example has two processors 91, a memory bank 92, and a control logic chip 93. However, as indicated above, card 15 could have any type or types of ICs, in addition to or instead of processing and memory components. A heat conductor 13 is connected to each processor 91, but additional heat conductors could be connected to memory bank 92, control logic chip 93, or to the substrate 94 upon which the ICs are mounted.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A thermal connection system for connecting integrated circuit components to a heat sink, the components and the heat sink being arranged substantially side by side in a housing, comprising:

a number of component heat conductors, each having a heat input end and a heat output end, the heat input end operable to connect to an integrated circuit component such that the component heat conductor extends from the integrated circuit component in a direction substantially parallel to, and side by side with, other component heat conductors, and terminating at one side of the housing;

a number of arterial heat conductors, one associated with each component heat conductor, each having a heat input end and a heat output end, the heat output end attached to the heat sink, and each arterial heat conductor extending from the heat sink along said one side of the housing; and a number of thermal connectors, each operable to thermally connect the heat output end of a component heat conductor to the heat input end of the associated arterial heat conductor, and operable to provide a generally orthogonal connection of the component heat conductor to the arterial heat conductor proximate said one side of the housing.

2. The system of claim 1, wherein each connector is removably attached to the heat output end of a component heat conductor.

3. The system of claim 1, wherein the thermal connector has an opening for receiving the heat output end of the component heat conductor.

4. The system of claim 1, wherein the thermal connector has a mating surface for receiving the component heat conductor.

5. The system of claim 1, wherein the connector is removably attached to the heat input end of the arterial heat conductor.

6. The system of claim 1, wherein the connector is translatably connected along the arterial heat conductor.

7. The system of claim 1, wherein the connector is translatably connected along the component heat conductor.

8. A method of providing thermal connections from internal components of a computer system to a heat sink, comprising the steps of:

arranging the internal components and the heat sink as side by side modules within a housing;

connecting a component heat conductor to a component, the component heat conductor having a heat input end and a heat output end, the connection to the component being at the heat input end such that the component heat conductor extends from the component in a direction substantially parallel to, and side by side with, other component heat conductors, and terminating at one side of the housing;

connecting at least one arterial heat conductor to the heat sink at a heat output end of the arterial heat conductor, each arterial conductor extending from the heat sink along said one side of the housing;

thermally connecting each component heat conductor to its associated arterial heat conductor, using a thermal connector that is attached to the heat output end of the component heat conductor and that provides a generally orthogonal connection of the component heat conductor to the arterial heat conductor proximate to said one side of the housing; and repeating the above steps for a desired number of components.

9. The method of claim 8, wherein each connector is removably attached to the heat output end of a component heat conductor.

10. The method of claim 8, wherein the thermal connector is removably attached to a heat input end of the arterial heat conductor.

11. A thermal connector for connecting two heat conductors to each other, comprising:

a top portion having first means for attachment of a first heat conductor;

a bottom portion having second means for attachment of a second heat conductor;

a thermal core for transferring heat between the first heat conductor and the second heat conductor; and wherein the means for attachment of the top portion and the means for attachment of the bottom portion provide a substantially orthogonal connection of the first heat conductor and the second heat conductor.

12. A computer system, comprising:

at least one computing module, the module having at least one integrated circuit component;

a heat sink;

wherein the module and the heat sink are arranged substantially side by side in a housing;

a number of component heat conductors, each having a heat input end and a heat output end, the heat input end connected to an integrated circuit component such that the component heat conductor extends from the integrated circuit component in a direction substantially parallel to, and side by side with, other component heat conductors, and terminating at one side of the housing;

an arterial heat conductor associated with each component heat conductor, having a heat input end and a heat output end, the heat output end attached to the heat sink, and each arterial heat conductor extending from the heat sink along said one side of the housing; and a thermal connector that thermally connects the heat output end of each component heat conductor to the heat input end of the associated arterial heat conductor, and operable to provide a generally orthogonal connection of the component heat conductor to the arterial heat conductor proximate said one side of the housing.

13. The system of claim 12, wherein the connector is removably attached to the heat output end of a component heat conductor.

14. The system of claim 12, wherein the connector is removable from the arterial heat conductor.

\* \* \* \* \*